(12) United States Patent
Monson et al.

(10) Patent No.: US 8,484,974 B1
(45) Date of Patent: Jul. 16, 2013

(54) DUAL-PHASE THERMAL ELECTRICITY GENERATOR

(75) Inventors: Robert J. Monson, St. Paul, MN (US); John P. Abraham, Minneapolis, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 931 days.

(21) Appl. No.: 12/607,423

(22) Filed: Oct. 28, 2009

(51) Int. Cl.
*B60K 16/00* (2006.01)

(52) U.S. Cl.
USPC .................................................. 60/641.8

(58) Field of Classification Search
USPC ............... 60/641.8, 641.9, 641.11, 641.15, 60/645, 670, 671, 675
See application file for complete search history.

(56) References Cited

U.S. PATENT DOCUMENTS

| | | | | |
|---|---|---|---|---|
| 4,186,559 A | | 2/1980 | Decker et al. | |
| 4,546,608 A | * | 10/1985 | Shiina et al. | 60/649 |
| 6,064,572 A | * | 5/2000 | Remsburg | 361/700 |
| 2007/0151969 A1 | * | 7/2007 | Tain et al. | 219/631 |
| 2008/0178589 A1 | * | 7/2008 | He et al. | 60/531 |

* cited by examiner

*Primary Examiner* — Thomas Denion
*Assistant Examiner* — Jonathan Matthias
(74) *Attorney, Agent, or Firm* — Hamre, Schumann, Mueller & Larson, P.C.

(57) ABSTRACT

This disclosure relates to a device and system capable of producing electricity by using a temperature gradient and a dual-phase fluid to convert thermal energy into electrical energy. The system relies on a sealed enclosed volume that utilizes a thermal gradient to vaporize and condense a dual-phase fluid. The cycle of the fluid transforming between the two phases is used to turn a turbine to create electricity. The thermal gradient can be enhanced using energy input from the sun.

16 Claims, 2 Drawing Sheets

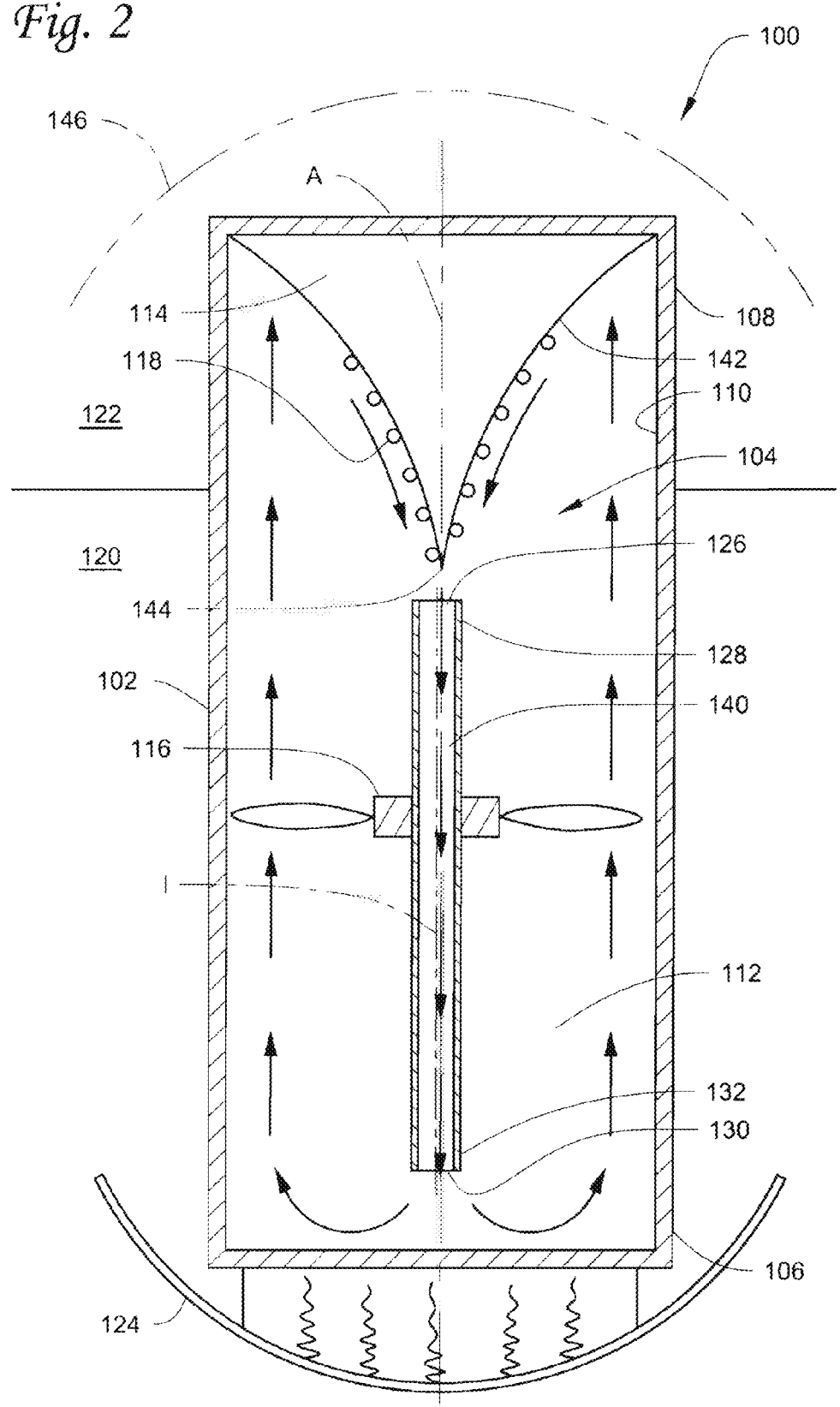

DUAL-PHASE THERMAL ELECTRICITY GENERATOR

FIELD

This disclosure relates to a device and system capable of producing electricity by using a temperature gradient and a dual-phase fluid to convert thermal energy into electrical energy.

BACKGROUND

A wide number of sources are known to produce energy including fossil fuels, nuclear energy, and hydroelectric energy. In recent years, there has been a push to find alternative energy sources that are non-polluting, safe and energy efficient.

SUMMARY

A dual-phase electricity producing device and system is described that is capable of converting thermal energy into electricity.

The system relies on an enclosed volume of some shape that utilizes a thermal gradient to vaporize and condense a dual-phase fluid. The cycle of the fluid transforming between the two phases is used to create electricity. The thermal gradient can be enhanced using energy input from the sun.

One embodiment of the system comprises an enclosed volume of some shape that has a volume, an inside surface and a first and second end. The first end defines an evaporation region and the second end defines a condensation region. The condensation region is located in a first environment and the evaporation region is located in a second environment. The first environment is at a different temperature than the second environment. A dual-phase fluid is disposed within the volume. A turbine is also located inside the enclosed volume between the evaporation and condensation regions.

In another embodiment of the system, the condensation region is disposed in the first environment where the first environment is water and is at a lower temperature than the second environment. A wicking material is disposed on the inside surface of the enclosed volume and extends between the condensation region and the evaporation region. A sleeve may surround the turbine and is disposed between an outer perimeter of the turbine and the wicking material. The system may also include a heat input device attached to the enclosed volume adjacent the evaporation region.

A device for producing electricity is disclosed which comprises an enclosed volume having a sealed space, a volume, an inside surface, a first end and a second end. In one embodiment, the first end defines an evaporation region and the second end defines a condensation region. A turbine is disposed within the enclosed volume between the first and second ends. A dual-phase fluid is also disposed within the sealed space. A heat input device is attached to the enclosed volume adjacent the first end of the enclosed volume. The evaporation region and condensation region could be located in a variety of locations within the enclosed volume as long as their respective locations causes vapor to pass over the turbine.

In another embodiment of the device, the enclosed volume has a longitudinal axis that is substantially vertical. The first end defining the evaporation region is located below the second region defining the condensation region. The evaporation region is at a temperature higher than the condensation region. A drain passageway is disposed within the enclosed volume. The drain passageway has a longitudinal axis that is substantially parallel to the longitudinal axis of the enclosed volume. The drain passageway has a fluid input at a first end thereof and a fluid output at a second end thereof. The fluid input is positioned between the first end of the enclosed volume and the fluid output. The first end of the enclosed volume may include a condensation concentrator in the condensation region with an apex that is coaxial with the longitudinal axis of the drain passageway.

DRAWINGS

FIG. 2 is a cross-sectional view of a duel-phase electricity producing system according to another embodiment.

DETAILED DESCRIPTION

Figure 1:
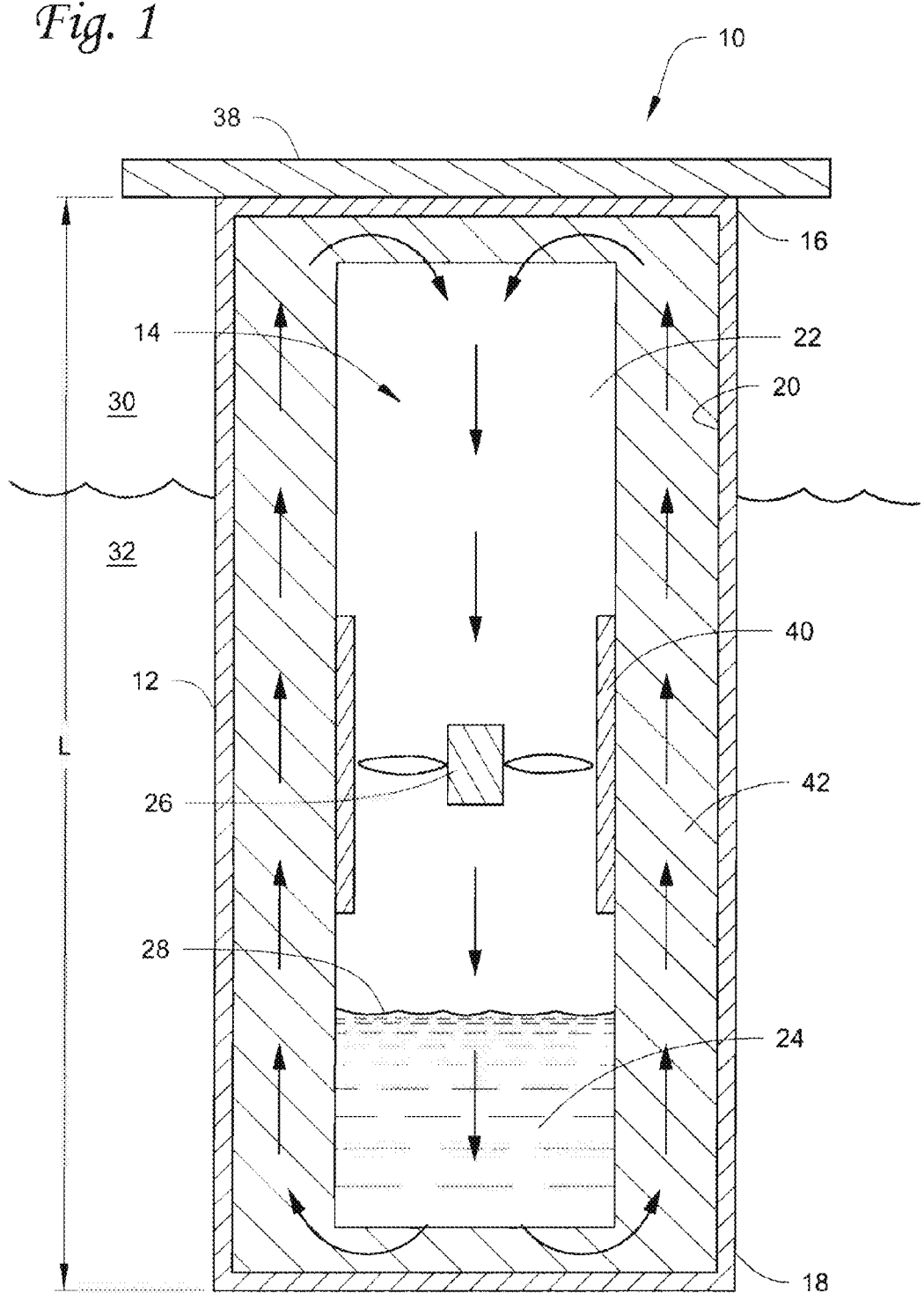
FIG. 1 is a cross-sectional side view of a dual-phase electricity generating system according to one embodiment.

An electricity producing system is described that relies on a thermal gradient to vaporize and condense a dual-phase fluid. The cycle of the fluid transforming between the two phase states is used to create electricity. In particular, the system comprises a dual-phase fluid disposed within a sealed enclosed volume. The enclosed volume is exposed to a thermal gradient, which in turn creates a temperature differential within the enclosed volume itself. The dual-phase fluid vaporizes and condenses within the enclosed volume. The movement of the dual-phase fluid between these two phases is harnessed to create electricity.

FIG. 1 illustrates an example of a dual-phase electricity producing system 10 incorporating the concepts described herein. The system 10 includes a sealed enclosed volume 12. The sealed enclosed volume 12 has an interior space 14 which defines a volume, a first end 16 and a second end 18 and an inside surface 20. The first end 16 defines an evaporation region 22 and the second end 18 defines a condensation region 24. A turbine 26 is disposed within the enclosed volume 12 between the first end 16 and the second end 18. A dual-phase fluid 28 is located within the sealed space of the enclosed volume 12. The enclosed volume 12 is not limited to any one shape. For example it could be shaped as a cylinder or rectangle or any shape capable of having the aforementioned components. Enclosed volume 12 is evacuated of air and prepared with the dual-phase fluid 28 in liquid form or in a mixture liquid and vapor. A small amount of air may be left in the enclosed volume 12 after it is evacuated.

To operate the system, the enclosed volume 12 is disposed in two environments. The first end 16 of enclosed volume 12 is disposed in a first environment 30 and the second end 18 of enclosed volume 12 is disposed in a second environment 32. The first environment 30 and second environment 32 may be the same or different types of environments as long as they are of a different temperature. Examples of environments are land, air and water. Any environment can be used as long as the evaporation region 22 is in an environment capable of reaching the temperature of vaporization. For example, in FIG. 1, the first environment 30 is shown as air and the second environment 32 is shown as water.

The evaporation region 22 of the dual phase fluid can be located anywhere within the enclosed volume 12 where the temperature exceeds the temperature of evaporation, and the condensation region 24 of the dual phase fluid 28 can be located anywhere within the enclosed volume 12 where the temperature is below the temperature of condensation so long as the vapor travels over the turbine 26.

The temperature difference between the first environment 30 and the second environment 32 creates a temperature gradient along a length (L) of the enclosed volume 12. The temperature inside of the enclosed volume 12 adjusts to the temperature of the environment in which it is placed. The amount of temperature difference between the first environment 30 and the second environment 32 can vary so long as the temperature difference is great enough to allow the dual-phase fluid 28 to vaporize in the evaporation region 22 and condense at the condensation region 24 within the enclosed volume 12. As the dual-phase fluid 18 vaporizes at the evaporation region 22, the vapor pressure inside the enclosed volume 12 will go up, which in turn, will increase both the heat of vaporization and condensation within the enclosed volume 12.

The dual-phase fluid 28 can be any fluid capable of evaporating and condensing at the temperatures in the evaporation region 22 and condensation region 24 respectively. Examples of a dual-phase fluid 28 that may be used in the system 10 include but are not limited to, water, alcohol or polyalphaolefin. For example, when liquid water vaporizes into a gas, it absorbs the heat of vaporization in the evaporation region 22. As more water vaporizes, the pressure inside the enclosed volume 12 increases. This increase in pressure increases both the vaporization point as well as the condensation point within the enclosed volume. This process continues until the temperature reaches the point at which condensation can occur, which includes a locale for condensation and the appropriate dew point. At this point, the dual-phase fluid 28 will condense, and the pressure will drop within the condensation region 24, releasing energy equivalent to the heat of condensation.

In one embodiment, the evaporation region 22 of the enclosed volume 12 is heated by the first environment 30 to a temperature at which the dual-phase fluid 28 vaporizes. FIG. 1 also shows a heat input device 38 attached to the enclosed volume 12 adjacent to the evaporation region 22. The heat input device 38 concentrates heat into the evaporation region 22 so that a larger temperature difference exists between the evaporation region 22 and the condensation region 24. The heat input device 38 can be any type of device capable of heating the evaporation region 22 to the temperature of vaporization. In FIG. 1, the heat input device 38 uses solar energy to absorb and focus heat into the evaporation region 22. An example of a heat input device 38 that uses solar energy is a solar panel or an array of focused mirrors or lenses. As the dual-phase fluid 18 vaporizes in the evaporation region 22, it increases in pressure, and travels to the condensation region 24 which is at a lower pressure and temperature. As the vapor travels, it rotates the turbine 26 which transforms thermal energy into kinetic energy. The turbine 26 transforms kinetic energy in the form of vapor movement into electrical energy by means of induced potential differences resulting in electrical current in the turbine 26. The turbine 26 can be located anywhere along the inside of the enclosed volume 12 so long as it is between the evaporation region 22 and the condensation region 24. The dual-phase fluid 18 condenses back into a liquid in the condensation region 24.

If the condensation region 24 is below the evaporation region 22, as shown in FIG. 1, the liquid form of the dual-phase fluid 28 will need some way to travel back to the evaporation region 22. In one embodiment, the inside surface 20 of the enclosed volume 12 is lined with a wicking material 42 along its length between the first 16 and second end 18. The wicking material 42 can be any material capable of allowing the condensed fluid to travel back up to the evaporation region 22 within the enclosed volume 12 by capillary action. Examples of such materials are plastic wool, stainless steel, aluminum foam or carbon nano fibers or combination thereof. A sleeve 40 may be disposed between the wicking material 42 and the outer perimeter of the turbine 26 so that the turbine 26 has no contact with the wicking material 42. To maintain efficiency in energy conversion, a good seal must be maintained between the turbine 26 and the sleeve 40 such that any pressure gradient can turn the turbine 26. The sleeve 40 also assures more laminar flow of the dual-phase fluid 18 as it moves through the turbine 26. The closer the condensation region 24 and evaporation region 22 are to the turbine 26, the less wicking distance is required.

In FIG. 1, the amount of energy (electricity) produced is directly proportional to the amount of fluid that can be effectively wicked from the condensation region 24 to the evaporation region 22. The wicking material 42 can make up any percentage of the interior volume 12 that is capable of wicking enough fluid to generate electricity from the system 10.

FIG. 2 shows an example of a dual-phase electricity producing system 100 that operates similarly to the system 10 shown in FIG. 1, except that the system 100 uses gravity rather than wicking material 42 to transport a dual-phase fluid 118 in its liquid phase. The system 100 includes a sealed enclosed volume 102 of some shape having an interior space 104 which defines a volume, a first end 106 and a second end 108 and an inside surface 110. The first end 106 defines an evaporation region 112 and the second end 108 defines a condensation region 114. One or more turbines 116 are disposed within the enclosed volume 102 between the first end 106 and the second end 108. The dual-phase fluid 118 is located within the interior space 104 of the enclosed volume 102. A heat input device 124 is attached to the enclosed volume 102 adjacent to the first end 106. Alternatively or in addition to the heat input device 124, a solar shield 146 may be attached to the enclosed volume 102 adjacent the second end 108.

To operate the system 100, the enclosed volume 102 is oriented substantially vertical along a longitudinal axis (A) of the enclosed volume 102 such that the condensation region 114 is above the evaporation region 112. A drain passageway 140 is disposed within the enclosed volume 102 and has a longitudinal axis (l) that is substantially parallel to the longitudinal axis (A) of the enclosed volume 102. The drain passageway 140 has a fluid input 126 at a first end 128 and a fluid output 130 at a second end 132. The fluid input 126 is positioned between the second end 108 of the enclosed volume 102 and the fluid output 130 so that the input 126 is vertically above the output 130. In FIG. 2, enclosed volume 102 is shown as a cylinder, but it can be of any shape capable of having the aforementioned components.

When used, the first end 106 of enclosed volume 102 is disposed in a first environment 120 and the second end 108 of enclosed volume 102 is disposed in a second environment 122. The first environment 120 and second environment 122 may be the same type of environment as long as they are of a different temperature. Examples of environments are land, air and water. Any type of environment can be used as long as the evaporation region is in an environment 122 capable of reaching the temperature of vaporization. For example, in FIG. 2, the first environment 120 is shown as air and the second environment 122 is shown as air.

The heat input device 124 can be any device capable of heating the evaporation region 112 to the temperature of vaporization, in one example, the heat input device 124 uses solar energy to heat the evaporation region 112, and may be, for example, a solar deflector such as a mirror, or series of mirrors. FIG. 2 shows the heat input device 124 using solar energy to heat the evaporation region 112 by deflecting solar energy into the first end 106 of the enclosed volume 102 such that it warms the evaporation region 112 to the temperature of vaporization for the dual-phase fluid 118. The heat input device 124 is shown in FIG. 2 as being concave in shape. However, the heat input device 124 can be any shape capable of warming the evaporation region 112 to the temperature of vaporization for the dual-phase fluid 118.

The solar shield 146 can be any device capable of deflecting solar energy away from the second end 108 of the enclosed volume 102 such that less solar energy enters the second end 108 of the enclosed volume 102 than the first end 106 of the enclosed volume 102 causing the temperature at the second end 108 to be lower than the temperature at the first end 106. The solar shield 146 may be, for example, made from polarizing film or reflective film. In FIG. 2, the solar shield 146 is shown being a concave shape. However, the solar shield 146 can be any shape as long as it limits the amount of solar energy that enters the second end 108 of enclosed volume 102.

As the heat input device 124 warms up the evaporation region 112, a heat gradient forms within enclosed volume 102 between the first end 106 and the second end 108. The amount of temperature difference between the first end 106 and the second end 108 can vary so long as the temperature difference allows the dual-phase fluid 118 to vaporize at the evaporation region 112 and condense at the condensation region 114 in a cyclical fashion within the enclosed volume 102.

The dual-phase fluid 118 can be any fluid capable of evaporating and condensing at the temperatures in the evaporation region 112 and the condensation region 114 in a cyclical fashion respectively. Some examples of a dual-phase fluid 118 include, but are not limited to, water, alcohol or polyalphaolefin.

As the dual-phase fluid 118 vaporizes at the evaporation region 112, it increases in heat and pressure. The vapor form of the dual-phase fluid 118 rises and travels upward to the condensation region 114 which is at a lower pressure and temperature. As the vapor travels upward, it turns the turbine or turbines 116 and creates electricity in a manner similar to that described in FIG. 1. The turbine or turbines 116 can be located anywhere along the inside of the enclosed volume so long as it is between the evaporation region 112 and the condensation region 114.

When the vapor form of the dual-phase fluid 118 reaches the condensation region 114, it condenses into its liquid phase. The liquid phase of the dual-phase fluid 118 is moved by gravity into the fluid input 126 of the drain passageway 140 and travels down the passageway 140 and out the fluid output 130 into the evaporation region 112. In one embodiment, the enclosed volume 102 includes a condensation concentrator 142 located in the condensation region 114 where the dual-phase liquid 118 can collect after condensing. The condensation concentrator 142 has an apex 144 that is coaxial with the longitudinal axis (l) of the drain passageway 140. The dual-phase fluid 118 is directed by gravity along the apex 144 of the condensation concentrator 142 into the fluid input of the fluid passageway. The apex 144 may sit above or extend inside the fluid input 126 of the fluid passageway 140.

The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A system configured to convert thermal energy into kinetic energy, comprising:
   an enclosed volume having a sealed space with an inside surface, a first end and a second end, the first end defining an evaporation region and the second end defining a condensation region, the enclosed volume being, oriented so that the condensation region is positioned vertically above the evaporation region;
   a dual-phase fluid within the sealed space;
   a turbine disposed within the enclosed volume between the first and second ends, the turbine is rotatable about a rotation axis; and
   a condensate drain passageway disposed within the enclosed volume and extending through the turbine to direct the dual-phase fluid in its liquid state to the evaporation region, the drain passageway having an axis that is coaxial to the rotation axis.

2. The system of claim 1, wherein the condensate drain passageway has a fluid input on one side of the turbine that is positioned between the turbine and the second end, and a fluid output on an opposite side of the turbine that is positioned between the turbine and the first end.

3. The system of claim 1, further comprising a heat input device attached the enclosed volume adjacent to the first end.

4. The system of claim 3, wherein the heat input device is a solar deflector.

5. The system of claim 3, further comprising a solar shield attached to the enclosed volume adjacent to the second end.

6. The system of claim 5, wherein the solar shield is configured to deflect solar energy away from the second end.

7. The system of claim 1, wherein the second end of the enclosed volume includes a condensation concentrator in the condensation region with an apex that is coaxial with the drain passageway.

8. The system of claim 1, wherein the dual-phase fluid in its liquid state is moved by gravity through the condensate drain passageway to the evaporation region, and there is no wicking material that is used to transport the dual-phase fluid in its liquid state to the evaporation region.

9. A system configured to convert thermal energy into kinetic energy, comprising:
   an enclosed volume having a sealed space with an inside surface, a first end and a second end, a longitudinal axis extending from the first end to the second end, the first end defining an evaporation region and the second end defining a condensation region;
   the enclosed volume being oriented substantially vertically so that the longitudinal axis extends substantially vertically with the condensation region being positioned vertically above the evaporation region;
   a dual-phase fluid within the sealed space;
   a turbine disposed within the enclosed volume between the first and second ends, the turbine is rotatable about an axis that is coaxial to the longitudinal axis; and
   a condensate drain passageway disposed within the enclosed volume and extending through the turbine to direct the dual-phase fluid in its liquid state to the evaporation region, the drain passageway having a longitudinal axis that is coaxial to the longitudinal axis of the enclosed volume.

10. The system of claim 9, wherein the condensate drain passageway has a fluid input on one side of the turbine that is positioned between the turbine and the second end, and a fluid output on an opposite side of the turbine that is positioned between the turbine and the first end.

11. The system of claim 9, further comprising a heat input device attached to the enclosed volume adjacent to the first end.

12. The system of claim 11, wherein the heat input device is a solar deflector.

13. The system of claim 11, further comprising a solar shield attached to the enclosed volume adjacent to the second end.

14. The system of claim 13, wherein the solar shield is configured to deflect solar energy away from the second end.

15. The system of claim 9, wherein the second end of the enclosed volume includes a condensation concentrator in the condensation region with an apex that is coaxial with the longitudinal is of the drain passageway.

16. The system of claim 9, wherein the dual-phase fluid in its liquid state is moved by gravity through the condensate drain passageway to the evaporation region, and there is no wicking material that is used to transport the dual-phase fluid in its liquid state to the evaporation region.

\* \* \* \* \*